US008379086B2

(12) United States Patent
Merkel et al.

(10) Patent No.: US 8,379,086 B2
(45) Date of Patent: Feb. 19, 2013

(54) SURVEILLANCE MODULE FOR A VIDEO SURVEILLANCE SYSTEM, METHOD FOR MONITORING THE STATE OF A SURVEILLANCE REGION, AND COMPUTER PROGRAM

(75) Inventors: Marcel Merkel, Obevengstringen (CH); Marco Boltz, Hildesheim (DE); Matthias Koenig, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/812,836

(22) PCT Filed: Nov. 11, 2008

(86) PCT No.: PCT/EP2008/065258
§ 371 (c)(1),
(2), (4) Date: Nov. 19, 2010

(87) PCT Pub. No.: WO2009/089933
PCT Pub. Date: Jul. 23, 2009

(65) Prior Publication Data
US 2011/0050899 A1    Mar. 3, 2011

(30) Foreign Application Priority Data
Jan. 15, 2008   (DE) .......................... 10 2008 004 369

(51) Int. Cl.
*H04N 7/18*   (2006.01)
(52) U.S. Cl. ....................................... 348/143; 725/105
(58) Field of Classification Search .................. 348/143; 725/105
See application file for complete search history.

(56) References Cited

U.S. PATENT DOCUMENTS

| 6,924,072 B2 * | 8/2005 | Hong et al. ...................... 430/30 |
| 6,956,196 B2 * | 10/2005 | Duhon .......................... 250/221 |
| 7,042,492 B2 * | 5/2006 | Spinelli ......................... 348/143 |
| 2004/0233283 A1 | 11/2004 | Kang et al. |

FOREIGN PATENT DOCUMENTS

| DE | 199 04 093 | 8/2000 |
| EP | 0 967 584 | 12/1999 |
| GB | EP 0 967 584 A2 * | 4/1999 ...................... 13/194 |

* cited by examiner

*Primary Examiner* — Benjamin R Bruckart
*Assistant Examiner* — Marie Georges Henry
(74) *Attorney, Agent, or Firm* — Michael J. Striker

(57) ABSTRACT

Video monitoring systems usually comprise one or more monitoring cameras directed to related monitored areas such as intersections, parking lots, manufacturing plants, etc., wherein the image data streams recorded by the monitoring camera (S) are often collected at a monitoring center. In the automated evaluation of image data streams, there are known methods that detect moving objects in the monitored area, track them and carry out evaluations based on the detection or tracking. On the other hand, a monitoring module 4 for a video monitoring system 1 is proposed, wherein the monitoring module 4 can be data-coupled and/or is data-coupled to at least one monitoring camera (2), wherein the at least one monitoring camera 2 is directed to a monitored area and the monitored area can be displayed or is displayed as a monitoring scene that includes or can include moving foreground objects and a scene background, and wherein the monitoring module 4 is designed for the analysis of the monitoring scene and for the output of a signal based on the analysis, wherein the output of the signal based on the analysis of the scene background occurs upon deviations in prescribed base states.

12 Claims, 3 Drawing Sheets

SURVEILLANCE MODULE FOR A VIDEO SURVEILLANCE SYSTEM, METHOD FOR MONITORING THE STATE OF A SURVEILLANCE REGION, AND COMPUTER PROGRAM

BACKGROUND INFORMATION

The invention relates to a surveillance module for a video surveillance system, wherein the surveillance module can be data-coupled and/or is data-coupled to at least one surveillance camera, wherein the at least one surveillance camera is directed to a surveillance region, and the surveillance region can be displayed or is displayed as a surveillance scene that includes or can include moving foreground objects, and wherein the surveillance module is designed to analyze the surveillance scene and to output a signal on the basis of the analysis. The invention furthermore relates to a method for monitoring a surveillance region, and to a computer program.

Video surveillance systems typically include one or more surveillance cameras that are directed to relevant surveillance regions such as intersections, parking lots, factory halls, etc., wherein the image data streams recorded by the surveillance camera (S) are often combined in a surveillance center. In this surveillance center, the image data streams are then typically evaluated by surveillance personnel or in an automated manner using image-processing algorithms.

Methods are known for the automated evaluation of the image data streams that detect and track moving objects in the surveillance region and perform evaluations on the basis of the detection or tracking.

Publication DE 199 04 093 A1, for example, which is the closest prior art, discloses a method for the automatic detection of occupancy of parking spaces in a parking area. According to this method, it is provided that at least the entry and exit regions of at least one zone of a parking area are monitored using a video camera, wherein the current state of occupancy of the parking space is ascertained by investigating the direction of motion of detected vehicles by evaluating the corresponding image sequences.

DISCLOSURE OF THE INVENTION

A surveillance module having the features of claim 1, a method for monitoring a surveillance region having the features of claim 10, and a computer program for implementing the method having the features of claim 12 are provided within the scope of the invention. Preferred or advantageous embodiments of the invention result from the dependent claims, the description that follows, and the attached figures.

A surveillance module that is suitable and/or designed for a video surveillance system is provided within the scope of the invention. The video surveillance system preferably includes at least one surveillance camera and one central evaluation unit, wherein the surveillance module forms a part of the central evaluation unit. The central evaluation unit can be positioned centrally for a plurality of surveillance cameras, or it can be designed as a data processing unit in the at least one surveillance camera. The surveillance module can be data-coupled and/or is data-coupled to the at least one surveillance camera, thereby enabling the surveillance module to record and evaluate image data streams from the surveillance camera.

The at least one surveillance camera is directed to a surveillance region, such as a building, a building complex, corridors, rooms, public places, streets, intersections, etc. The surveillance region can be designed as an interconnected region, or as a plurality of individual regions. The actual surveillance region is displayed or can be displayed as a surveillance scene by the at least one surveillance camera, the surveillance scene being subdivided into moving foreground objects and a scene background, for purposes of definition. The moving foreground objects are pedestrians, persons, vehicles, etc., and the scene background is formed by the background and by stationary and/or quasi-stationary objects, in a manner described below. The term "scene background" is preferably understood to mean that it also includes objects or image regions that are situated in front, in terms of perspective, of the moving foreground objects.

The surveillance module is designed to evaluate the surveillance scene and to output a signal on the basis of the evaluation. In particular, the evaluation is carried out using image processing algorithms or digital image processing of the image data streams recorded using the at least one surveillance camera.

Within the scope of the invention it is provided that the surveillance module is designed to analyze the scene background for deviations from predefined base states.

In delineation from the known prior art, it is provided that the surveillance activity of the video surveillance system is focussed on the scene background, where it evaluates deviations from predefined base states which can also be defined as target states. The structural state and/or the functional state of functional components and/or components of the surveillance region are preferably monitored visually.

One consideration of the invention is to not use the surveillance module according to the invention to investigate the activities of moving foreground objects, that is, pedestrians or persons, automobiles, etc., but rather to monitor changes or states in the scene background, such as a structure and its functional components. The surveillance module is preferably designed to ignore the moving foreground objects e.g. by filtering out and/or sorting out the foreground objects.

On the basis of the invention, it is possible e.g. to substitute a video surveillance system that includes the surveillance module according to the invention for security systems for equipment and buildings, which monitor the state of the equipment and the buildings using switch contacts, smoke alarms, water alarms, light barriers, etc. It is known that non-video-based security systems require an extensive network of switchboard cables, which is preferably designed before the structure is built. If the security system is installed after the structure is built, installation costs are very high and extensive remodeling work is required. However, if a video surveillance system having the surveillance module according to the invention is substituted for a non-video-based security system, then installation is simple since only one single surveillance camera having a single cable need be installed to monitor a plurality of windows, for example, to determine if they are open or not. Likewise, an entire building facade that includes a large number of windows and doors can be effectively monitored using a single surveillance camera, for instance.

According to a preferred embodiment of the invention, the scene background is composed of stationary and quasi-stationary regions and/or objects, the surveillance module being designed to analyze the stationary and/or quasi-stationary regions or objects.

A stationary region or object preferably remains in the same image position for longer than one day, preferably for longer than one week, in particular for longer than one month, and especially for longer than one year. Stationary regions or objects of that type are formed e.g. by doors, windows, furniture, trees, houses, corridors, etc.

Quasi-stationary regions or objects preferably remain in the same position for at least longer than one hour, preferably longer than six hours, and in particular for longer than 12 hours. As an alternative, the duration of the stationary period can be entered by the user. Quasi-stationary regions and/or objects can also be present in regions that, per the user's definition, should remain stationary and/or unchanged for a defined period of time. For example, regions and/or objects situated in a locked room or in a blocked-off region could be defined as quasi-stationary regions or objects.

In an optional development of the invention, the surveillance module is designed to permit the manual and/or automatic definition of the base states of the surveillance scene and/or the stationary and/or quasi-stationary regions or objects. To permit manual definition, the surveillance module is coupled to a human-machine interface which the user can use to select base states and/or regions or objects for the evaluation. For example, the user can select stationary regions or objects and define their current state as the base state. As an alternative thereto, the user can select a region or an object, and the surveillance module then suggests various possible operating states for the user to choose from. In continuation of the example, the user selects doors or windows in a surveillance scene and activates them for the evaluation. As an alternative or in addition thereto, the user can select other objects or regions and activate them for the evaluation, as will be explained below.

According to a first possible embodiment of the invention, the deviation from the predefined base state relates to a change from a first regular operating state of one of the regions and/or one of the objects in the scene background to a second regular operating state. A prerequisite of this embodiment is that the selected region or the selected object be capable of assuming at least two regular operating states. Preferably, regular operating states are considered to be states of the regions or objects that can be assumed within the scope of normal use. For example, a first operating state can be that a door or a window is closed, a second operating state can be that the door or window has been opened slightly, and a third operating state is that the door or window has been fully opened. Basically, it is also possible e.g. to visually monitor a machine or another device for the output of optical signals, and therefore a first operating state can be characterized e.g. by a green signal light, and a second operating state can be characterized by a signal light having a different color.

Within the scope of defining the base states, it is possible to define any combination of the base states of the various regions or objects. For example, the definition can be that all windows or doors in the front of a house should be opened or closed, or that only a certain selection of the windows or doors must be open, and another portion must be closed.

According to a further embodiment of the invention, the deviation from the predefined base state relates to a change from a regular state of one of the regions and/or one of the objects in the scene background to an irregular state. The irregular state relates to a state defined on the basis of a "prohibition" rule. One possible "prohibition" rule might be the blockage of escape routes, wherein the escape route is monitored as a stationary region in the scene background to ensure that it does not become permanently blocked by additional objects. Another application can be the monitoring of objects for abnormal behavior, such as a strong movement of trees, thereby indicating that a storm is approaching, the detection of water entering a stationary region, or the detection of objects that have been destroyed or demolished.

According to a preferred realization, the deviation from the base state is investigated by analyzing the content of the object and/or the region in the scene background. For example, classification devices can be trained to distinguish between a first operating state and a second operating state of an object, such as between an open door or window and a closed window or door. Further content analyses can relate to the sudden change in brightness of an object or region, wherein light is detected that has entered corridors or even automobiles, as quasi-stationary objects, where it should not be.

According to another embodiment or a supplemental embodiment of the invention, the deviation from the base state is investigated by determining the position of the object and/or the region. If a stationary or quasi-stationary object or a corresponding region undergoes a significant change in position, this is likewise interpreted as a state change. A position change of that type can be registered e.g. as a tree bending or a fence falling down.

According to another possible, supplemental embodiment of the invention, the deviation from the base state is analyzed on the basis of the temporal and/or statistical behavior of the object and/or the region. This method of investigation makes it possible to predict storms, for instance, since trees that are located in the surveillance region move to an extreme extent in the strong winds that occur before a storm arrives and, as a result, extreme fluctuations of the images of the scene background or the stationary object can be detected using measurement technology.

According to a preferred embodiment, the operating state and/or the deviation from one of the following situations is evaluated using the surveillance module: A state change of windows or doors, in particular in terms of the open-closed state; detection of blockage in escape routes, in particular the detection of objects in marked regions; detection of stray light, in particular in regions of the scene background having the base state "dark" or "non-illuminated"; a storm warning which is based, in particular, on the evaluation of temporal and/or statistical fluctuations of the images recorded by the surveillance camera; a water-incursion warning which is based, in particular, on the evaluation of optical flow.

A further subject matter of the invention relates to a method for monitoring the state of a surveillance region, in particular of a building or a building complex, having the features of claim 10.

The following applications of the state monitoring according to the invention are likewise possible:

Building and/or area management within the scope of facilities management, wherein the objects to be monitored are components of the building and/or the area.

Object monitoring e.g. in a museum, wherein the positions of the objects, such as works of art in the museum, form the base state to be monitored.

State monitoring in automation, wherein in an automated warehouse, for instance, the shelves, as objects, are monitored for the base state "filled" or other base states.

According to a preferred embodiment, the method is implemented using the above-described surveillance module, wherein the surveillance region can be displayed or is displayed as a surveillance scene that includes moving foreground objects and a scene background, wherein base states of the scene background or sections thereof are predefined, and wherein changes to or deviations from the predefined base states are evaluated, and a signal, in particular an information signal, is output to surveillance personnel on the basis of the evaluation.

A final subject matter of the present invention relates to a computer program having the features of claim 12.

BRIEF DESCRIPTION OF THE DRAWINGS

Further features, advantages, and effects of the invention result from the description that follows of preferred embodiments of the invention, and from the attached figures. They show.

EMBODIMENT(S) OF THE INVENTION

Figure 1:
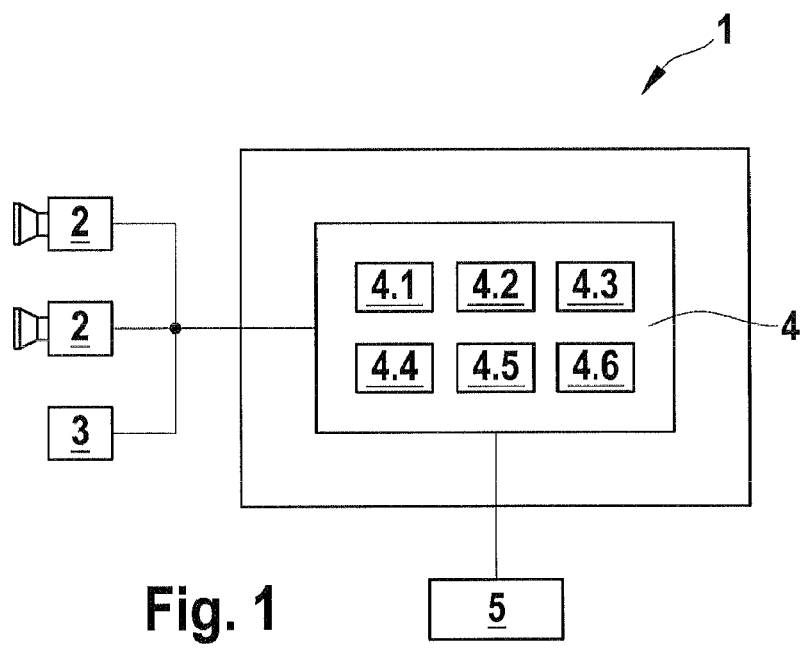
FIG. 1 a block diagram of a surveillance system having a surveillance module, as an embodiment of the invention.

FIG. 1 shows a video surveillance system 1 which is signal-connected to a plurality of surveillance cameras 2 or a memory device 3 for the temporary or permanent interim storage of image data streams from surveillance cameras 2. Surveillance cameras 2 are directed to one or more surveillance regions, wherein the surveillance regions are displayed as surveillance scenes by surveillance cameras 2. The depicted surveillance scenes are composed of moving objects, such as persons, pedestrians, or vehicles, and of stationary objects which form the scene background.

The image data streams are transferred to surveillance system 1, and are forwarded to a surveillance module 4. Surveillance module 4 includes a plurality of selectively activated surveillance components 4.1, 4.2, 4.3, 4.4, 4.5 and 4.6 which will be explained in detail below. Surveillance system 1 likewise includes a human-machine interface 5 that enables a user to enter parameters, conditions, or regions, and to activate or deactivate surveillance components 4.1 through 4.6. Surveillance components 4.1, 4.2, 4.3, 4.4, 4.5 and 4.6 perform the following functions:

Surveillance Component 4.1:

Monitors operating states of building components and/or system components

Surveillance component 4.1 is a substitution solution for monitoring building components or system components that are typically monitored by switch contacts or the like. To initialize surveillance component 4.1, surveillance sections that show building components or system components that can assume various operating states are defined in the surveillance region manually and/or in an automated manner. Operating states of that type relate e.g. to an open-closed state of a window, a door, a fence, a gate, a cabinet, a cover, or another functional element. After initialization, surveillance component 4.1 is capable of automatically detecting the operating state of the surveillance section on the basis of related image-processing algorithms, such as classifiers that are trained to distinguish e.g. between open and closed operating states of the functional elements.

In one possible embodiment, surveillance camera 2 is designed as a PTZ (pan-tilt-zoom) camera which is designed to cover a very large surveillance region by moving in a corresponding, controllable manner. In one possible embodiment, surveillance component 4.1 compares the state or operating state e.g. of a few or all doors or windows to a predefined base state and outputs an information signal if the current state does not correspond to the predefined base state. The base state can be dependent e.g. on a time of day (day/night switchover), weather (closing of windows and doors if it rains or storm), etc.

Figure 2:
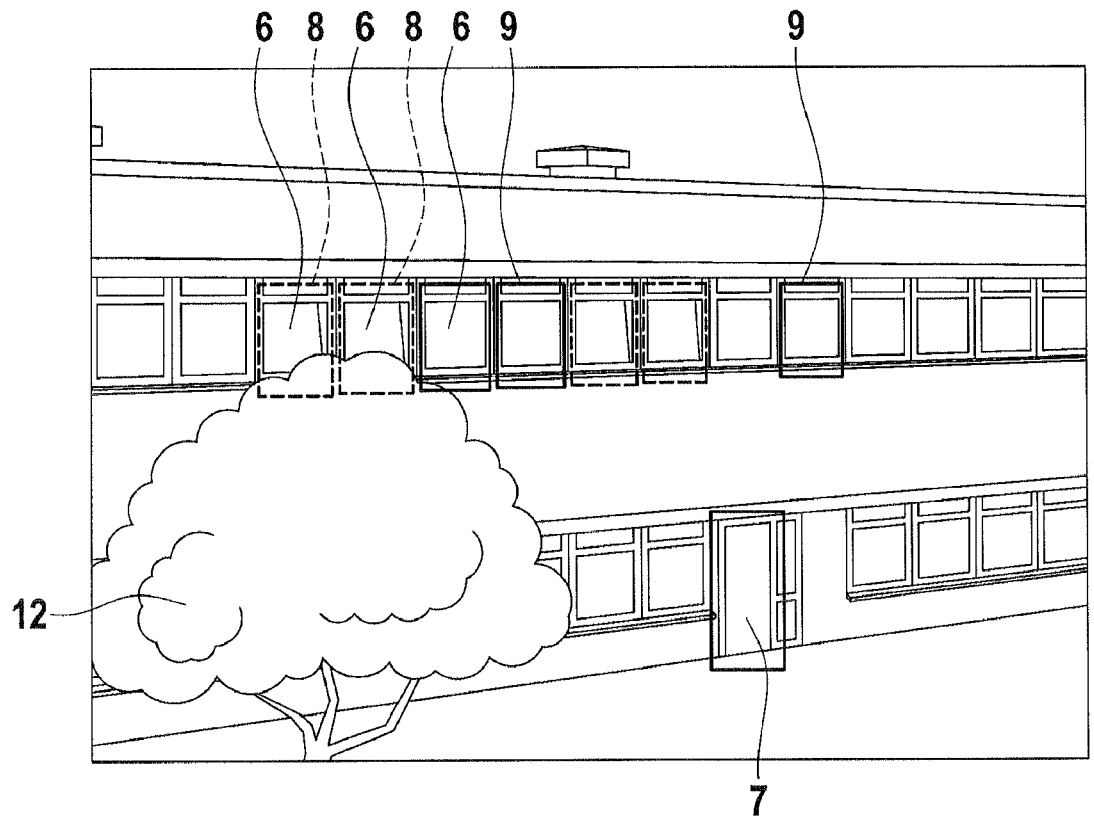
FIGS. 2, 3, 4 show surveillance scenes, as examples, to illustrate the method according to the invention.

As an example, FIG. 2 shows a camera image of a frontal view of a building that includes a plurality of windows 6 and one door 7. Surveillance component 4.1 is designed to detect the operating state of windows 6 and doors 7. For purposes of visualization, all opened windows 6 and doors 7 are depicted using a dashed outline 8, and all closed windows and doors are depicted using a solid outline 9, as the result of an automated detection of the operating state of the functional elements. By comparing to a previously entered base state, it can be determined whether the position of the window or door corresponds to the predefined base state.

Figure 3:
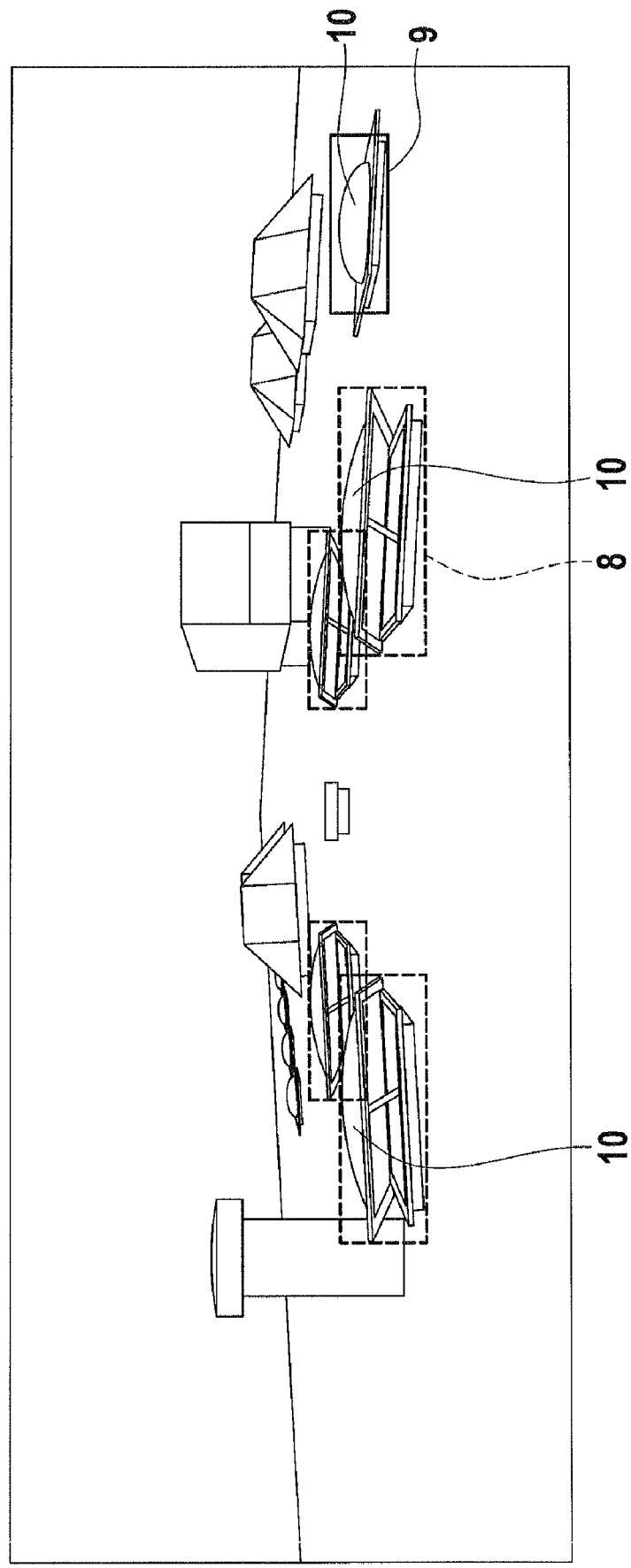

FIG. 3 shows a second embodiment of the invention, wherein surveillance component 4.1 checks the operating state of skylights 10 to identify the open or closed operating state.

Figure 4:
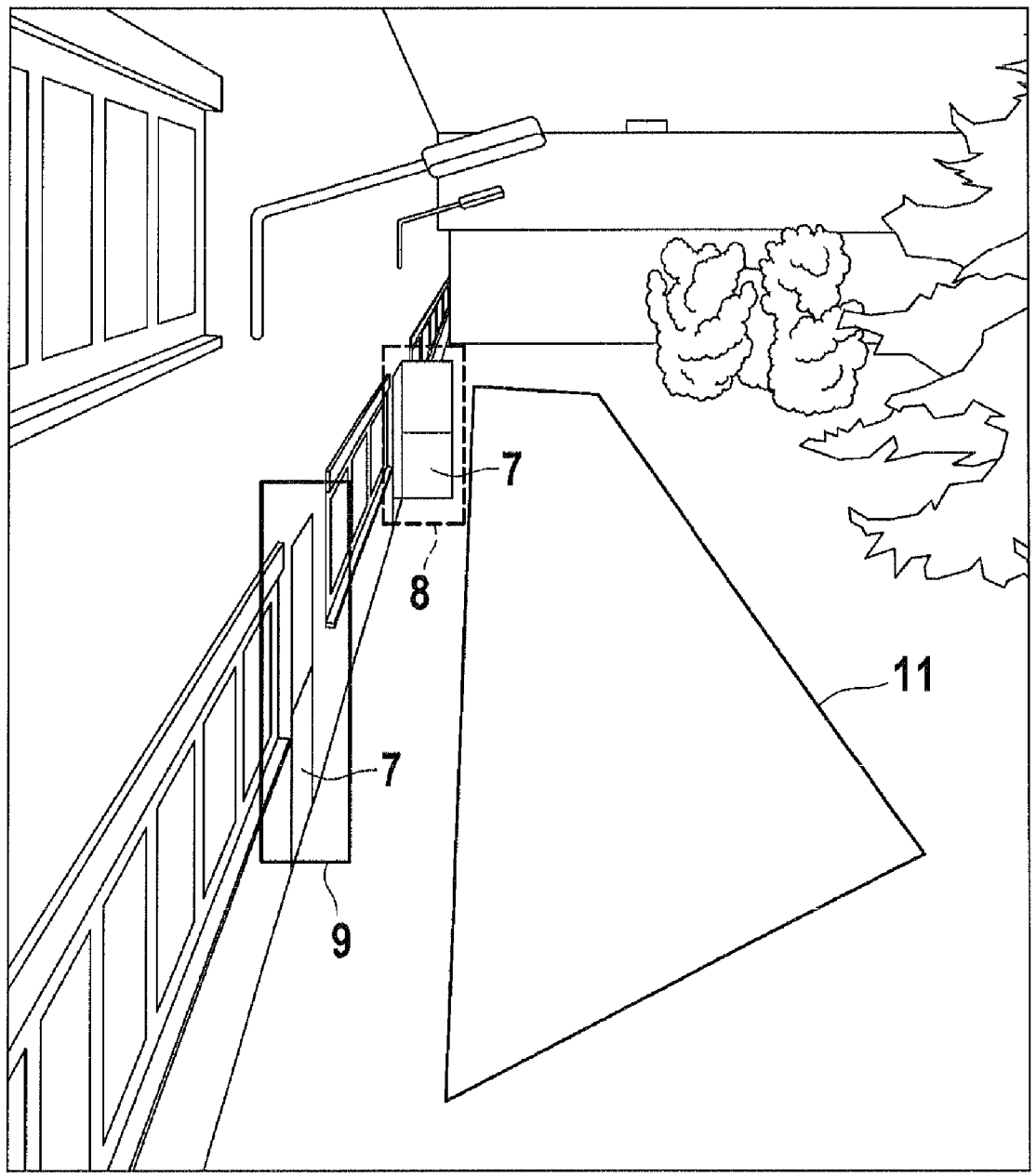

In FIG. 4, which shows a third embodiment of surveillance component 4.1, the position of surveillance camera 2 is adjusted to detect open doors 7 or windows 6 much more easily. Surveillance camera 2 is situated such that doors in a closed state are situated flush or substantially flush with the camera perspective, and, in an opened state, are situated perpendicularly or substantially perpendicularly to the alignment of the camera perspective.

Surveillance Component 4.2: Detects Obstacles in Blocked Areas and/or Paths

Surveillance component 4.2 is designed to detect obstacles in blocked-off areas or in blocked-off paths, wherein, once the blocked-off areas or paths have been learned, interfering objects are detected e.g. by comparing a current recording of the surveillance region to a reference recording of the surveillance region. As an optional supplementation, unexpected object movements in this region are detected. Path 11 in FIG. 4 can be defined as a blocked-off area of that type, for example, if path 11 must remain open at all times as an emergency fire truck lane.

Surveillance Component 4.3: Detects Light Sources

Surveillance component 4.3 makes it possible to define areas that should not be illuminated or that do not have lighting of their own. By monitoring for localized areas of brightness, abnormal light sources that deviate from this rule can be detected, and an information signal can be generated.

Surveillance Component 4.4: Storm Warning Device

Surveillance component 4.4 evaluates the movement of stationary objects such as trees 12 (FIG. 2), branches, or flags, and investigates them in terms of their temporal and/or statistical behavior. Bad weather conditions or storms can be detected on the basis of this investigation since the statistical fluctuations or the behavior over time of a tree 12 blowing in the wind, or of a branch, flag, or the like is a clear indicator of strong winds and, therefore, of an approaching storm.

Surveillance Component 4.5: Detects Destruction

When using a scene reference image as the base state of the surveillance scenes, surveillance component 4.5 can detect abnormalities in the surveillance scene, such as destruction, in particular collapsed fences and trees. A particular advantage is the fact that a comparison of that type does not necessarily require an understanding of the contents of the scene. In particular, the surveillance component detects abnormalities in the scene that cannot be identified on the basis of typical motions. Surveillance component 4.5 also provides the possibility of using a classification algorithm to identify and monitor objects. As an option, surveillance component 4.5 can be automatically activated as soon as surveillance component 4.4 indicates the possibility of a storm occurring.

Surveillance Component 4.6: Detects Damage Caused by the Elements

Damage caused by the elements, in particular water incursion or fire, can likewise be detected using image-processing algorithms, and can be reported to the surveillance module.

For example, water incursion is detected on the basis of its optical properties and, in particular, by evaluating the optical flow.

What is claimed is:

1. A surveillance module (4) for a video surveillance system (1) that includes at least one surveillance camera (2) and a human-machine interface (5), the surveillance module (4) comprising a plurality of selectively activated surveillance components and configured to be data-coupled and/or is data-coupled to the at least one surveillance camera (2) and to the human-machine interface (5),
   wherein the at least one surveillance camera (2) is directed to a surveillance region, and the surveillance region can be displayed or is displayed as a surveillance scene that includes or can include moving foreground objects,
   wherein the human-machine interface enables users to mark regions as escape routes,
   wherein the surveillance module (4) analyzes the surveillance scene and outputs a signal on the basis of the analysis, and
   wherein the signal is output on the basis of the analysis of the scene background if deviations from predetermined base states that relate to an existence of interfering objects in escape routes occur.

2. The surveillance module (4) according to claim 1, wherein the scene background is composed of stationary and quasi-stationary regions and/or objects (6, 7), and wherein the selectively activatable surveillance components are initiated to analyze respective ones of the stationary and/or quasi-stationary regions or objects (6, 7).

3. The surveillance module (4) according to claim 1, wherein initiating one or more of the selectively activatable surveillance components includes defining surveillance sections that show the base states of the surveillance scene and/or the stationary and/or quasi-stationary regions or objects associated with the surveillance components manually (5) and/or automatically.

4. The surveillance module (4) according to claim 1, wherein the deviation from the predefined base state includes a change from a first regular operating state (8) of one of the regions and/or one of the objects (6, 7) in the scene background to a second regular operating state (9).

5. The surveillance module (4) according to claim 1, wherein the deviation from the predefined base state includes a change from a regular state of one of the regions and/or one of the objects in the scene background to an irregular state.

6. The surveillance module (4) according to claim 1, wherein the deviation from the base state is investigated using a content analysis of the object and/or the region (6, 7).

7. The surveillance module (4) according to claim 1, wherein the deviation from the base state is investigated by determining the position of the object and/or the region (6, 7).

8. The surveillance module (4) according to claim 1, wherein the deviation from the base state is investigated on the basis of the temporal and/or statistical behavior of the object and/or the region (12).

9. The surveillance module according to claim 1, wherein the operating state and/or the deviation relates to one of the following situations:
   a state change in functional elements of a building or a device, in particular of windows or doors (6, 7):
   and existence of interfering objects in blocked-off regions (11) and/or areas, in particular in the escape routes;
   an existence of light sources in blocked-off regions (11) and/or areas; and
   an existence of irregular states of regions, in particular for the purpose of issuing storm warnings, detecting destruction, and/or warning against water incursion.

10. A method for monitoring a surveillance region, in particular a building or a building complex, using a video surveillance system comprising at least one surveillance camera (2), a human-machine interface (5) and a surveillance module (4), the method comprising steps of:
   directing the at least one surveillance camera (2) to the surveillance region;
   visually monitoring, using the surveillance module (4), a structural state and/or the functional state of functional components and/or structural elements of the surveillance region;
   operating the human-machine interface (5) to enable users to mark regions as escape routes
   outputting a signal based on an analysis of the scene background if deviations from the structural state and/or the functional state of the functional components and/or the structural elements that relate to an existence of interfering objects in the escape routes occurs.

11. The method according to claim 10, wherein the surveillance module (4) includes a plurality of selectively activated surveillance components and the step of visually monitoring includes that each of the selectively activated surveillance components monitor a structural and/or functional state of respective functional component and/or structural element of the surveillance region.

12. A computer program comprising program code means embedded in a non-transitory computer readable medium for carrying out all steps of the method according to claim 10 when the program is run on a computer and/or a surveillance module (4).

* * * * *